(12) United States Patent
Weir et al.

(10) Patent No.: US 8,631,822 B2
(45) Date of Patent: Jan. 21, 2014

(54) DUAL-FLOW VALVE AND SWIVEL

(75) Inventors: James William Weir, Houston, TX (US); Dean Allen Bennett, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 13/508,079

(22) PCT Filed: Jul. 6, 2011

(86) PCT No.: PCT/US2011/043063
§ 371 (c)(1),
(2), (4) Date: May 30, 2012

(87) PCT Pub. No.: WO2012/006344
PCT Pub. Date: Jan. 12, 2012

(65) Prior Publication Data
US 2013/0126769 A1 May 23, 2013

Related U.S. Application Data

(60) Provisional application No. 61/361,622, filed on Jul. 6, 2010.

(51) Int. Cl.
*F16K 31/06* (2006.01)
*F16K 5/00* (2006.01)
*F16K 5/06* (2006.01)

(52) U.S. Cl.
USPC .. 137/625.19; 137/595; 251/309; 251/315.01

(58) Field of Classification Search
USPC .................. 137/595, 625.18, 625.19, 625.32, 137/625.47; 251/309, 315.01
See application file for complete search history.

(56) References Cited

U.S. PATENT DOCUMENTS 2,154,945 A * 4/1939 Kyes ............................ 137/887
2,301,428 A * 11/1942 MacNeil .................. 137/625.19

(Continued)

FOREIGN PATENT DOCUMENTS

CA 2517407 A1 2/2006
EP 0375826 A1 7/1990

(Continued)

OTHER PUBLICATIONS

Vestavik, O.M., et al., "Reelwell Drilling Method—Full Scale Verification," SAOGE 2008, Dammam, Saudi Arabia, Nov. 15-17, 2008 (10 p.).

(Continued)

*Primary Examiner* — John K Fristoe, Jr.
*Assistant Examiner* — Frederick D Soski
(74) *Attorney, Agent, or Firm* — Conley Rose, P.C.

(57) ABSTRACT

A dual-flow valve includes an inner valve body defining a first flow path and an outer valve body circumscribing the inner valve body. The outer valve body and the inner valve body define a second flow path. The dual-flow valve includes a valve element disposed across the first flow path and the second flow path. The valve element has a first passage for selective flow alignment with the first flow path and a second passage for selective flow alignment with the second flow path. A dual flow swivel includes an upper and lower swivel body, with the lower body adapted to rotate relative to the upper body. Two separate flow paths extend through the swivel bodies allowing upwardly and downwardly directed flows through the swivel bodies.

16 Claims, 13 Drawing Sheets

(56) References Cited

U.S. PATENT DOCUMENTS

| | | | |
|---|---|---|---|
| 2,462,989 A * | 3/1949 | Mufich et al. | 454/286 |
| 2,805,087 A | 9/1957 | Shaw et al. | |
| 3,623,558 A | 11/1971 | Brown | |
| 3,908,697 A * | 9/1975 | Witzel | 137/625.47 |
| 3,970,335 A | 7/1976 | Curington et al. | |
| 4,565,213 A | 1/1986 | Giebeler | |
| 4,909,933 A * | 3/1990 | Carter et al. | 210/95 |
| 4,946,079 A * | 8/1990 | Campbell | 222/484 |
| 5,509,446 A * | 4/1996 | Bey | 137/625.32 |
| 6,308,739 B1 * | 10/2001 | Barbuto et al. | 137/625.19 |
| 6,684,722 B1 * | 2/2004 | Parrish | 74/5.22 |
| 7,114,522 B2 | 10/2006 | Silva | |
| 7,343,968 B2 | 3/2008 | Kubala | |
| 7,766,006 B1 * | 8/2010 | Manning | 126/99 R |
| 8,342,204 B2 * | 1/2013 | Dirker | 137/625.47 |
| 8,356,629 B2 * | 1/2013 | Koyama | 137/625.19 |
| 2002/0005299 A1 | 1/2002 | Estep et al. | |
| 2003/0051883 A1 | 3/2003 | Seneviratne et al. | |
| 2007/0169943 A1 | 7/2007 | Vestavik | |
| 2008/0251259 A1 | 10/2008 | Braddick | |

FOREIGN PATENT DOCUMENTS

| | | |
|---|---|---|
| GB | 2427425 B | 2/2009 |
| WO | 2010039042 A2 | 9/2009 |
| WO | 2010039043 A1 | 9/2009 |

OTHER PUBLICATIONS

PCT/US2011/043063 International Search Report and Written Opinion dated Feb. 23, 2012 (8 p.).

Reelwell Drilling Method Brochure dated Feb. 10, 2010 (8 p.).

\* cited by examiner

DUAL-FLOW VALVE AND SWIVEL

CROSS REFERENCE TO RELATED APPLICATIONS

This application is a 35 U.S.C. §371 national stage application of PCT/US2011/043063 filed Jul. 6, 2011, which claims the benefit of U.S. Provisional Application No. 61/361,622 filed Jul. 6, 2010, both of which are incorporated herein by reference in their entireties for all purposes.

STATEMENT REGARDING FEDERALLY SPONSORED RESEARCH OR DEVELOPMENT

Not applicable.

BACKGROUND

1. Field of the Invention

The disclosure relates to drilling fluid circulation systems. More particularly, the disclosure relates to top drive adapters that enable dual flow through a top drive portion of a drilling fluid circulation system.

2. Description of Related Art

A drilling fluid circulation system is defined by the complete circuitous path and the equipment through which the drilling fluid travels while drilling operations are ongoing. In conventional drilling practices, the drilling fluid circulation system starts at the mud tanks containing drilling fluid (also known as mud or drilling mud). Pumps are used to transfer the drilling fluid through various equipment and piping to a mud hose. From the mud hose, the drilling fluid is pumped down the bore of a drill string, which is suspended in a borehole. The drilling fluid flows into the bottom of the borehole through the drill bit at the bottom of the drill string. At the bottom of the borehole, the drilling fluid commingles with earth cuttings made by the drill bit. The drilling fluid with the earth cuttings (and other materials that the drilling fluid picks up in the borehole) is forced up a return annulus defined by the space between the drill string and the borehole wall to a mud treatment system, which removes the cuttings and extraneous materials from the drilling fluid and returns the clean drilling fluid to the mud tanks. The drilling fluid circulation system operates continuously during the drilling operation.

In conventional drilling with a top drive, the top drive is coupled to the top of the drill string and used to rotate the drill string. The top drive has a conduit through which drilling fluid can flow from the mud hose into the drill string. The mud hose is coupled to the top drive by a swivel, which is a type of sealing rotary joint. A valve is arranged between the conduit in the top drive and the drill pipe of the drill string. The valve is known by many names in the field, e.g., safety valve, kelly valve, internal blowout preventer, and kelly cock. The valve may perform one or more functions. A first function is that of preventing drilling fluid in the conduit from being dumped on the rig floor when the drill string is disconnected from the top drive, as may be the case when a pipe joint is to be attached to or removed from the drill string. Another function is to prevent drilling fluid in the drill string from flowing back through the conduit in the top drive to the mud hose. In conventional drilling with a top drive, the swivel and valve provide a single flow path for fluid exchange between the mud hose and the drill pipe.

Recently, a new drilling method has been proposed that involves use of a drill string having a dual-flow drill pipe, i.e., a drill pipe having two concentric fluid conduits. In the proposed drilling method, drilling fluid is pumped down the outer conduit of the dual-flow drill pipe. The drilling fluid in the outer conduit flows out the face of the drill bit and into the bottom of the borehole. At the bottom of the borehole, the drilling fluid commingles with earth cuttings made by the drill bit. So far, this operates the same way as the conventional drilling method. However, the proposed new drilling method includes directing the drilling fluid with earth cuttings back into the drill string, and particularly into the inner conduit of the dual-flow drill pipe, through openings in the wall of the drill string. The drilling fluid flows up the inner conduit of the dual-flow drill pipe to the mud treatment system at the surface. Thus, in the new drilling method, the return annulus is located inside the drill string instead of between the drill string and the borehole wall.

There is a need for top drive adapters, e.g., valve and swivel, that would enable the new drilling method with a top drive.

SUMMARY OF THE DISCLOSURE

In some embodiments, a dual-flow valve includes an inner valve body defining a first flow path and an outer valve body circumscribing the inner valve body. The outer valve body and the inner valve body define a second flow path. The dual-flow valve further comprises a valve element disposed across the first flow path and the second flow path. The valve element has a first passage for selective flow alignment with the first flow path and a second passage for selective flow alignment with the second flow path.

In some embodiments, a dual-flow swivel includes an upper swivel body and a lower swivel body. The upper swivel body comprises an upper seal ring, a first upper flow path, and a second upper flow path, where the first upper flow path is separate from the second upper flow path. The lower swivel body comprises a lower seal ring disposed adjacent to the upper seal ring, a first lower flow path, and a second lower flow path, where the first lower flow path is separate from the second lower flow path, the first lower flow path is in communication with the first upper flow path, and the second lower flow path is in communication with the second upper flow path.

In some embodiments, a dual-flow swivel includes a first vessel having a first bore, a second vessel having a second bore, and a tubular body having a first end received in the first bore and a second end received in the second bore. The tubular body has a side port at a location between the first end and the second end. The tubular body has a first flow path running from the first end to the second end and a second flow path running from the first end to the side port, where the first flow path is separate from the second flow path. The dual-flow swivel includes a first seal disposed between the first vessel and the tubular body and a second seal disposed between the second vessel and the tubular body.

In some embodiments, a drilling apparatus includes a top drive, a dual-flow swivel coupled to a first end of the top drive, and a dual-flow valve coupled to a second end of the top drive.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION OF DISCLOSED EMBODIMENTS

Figure 1:
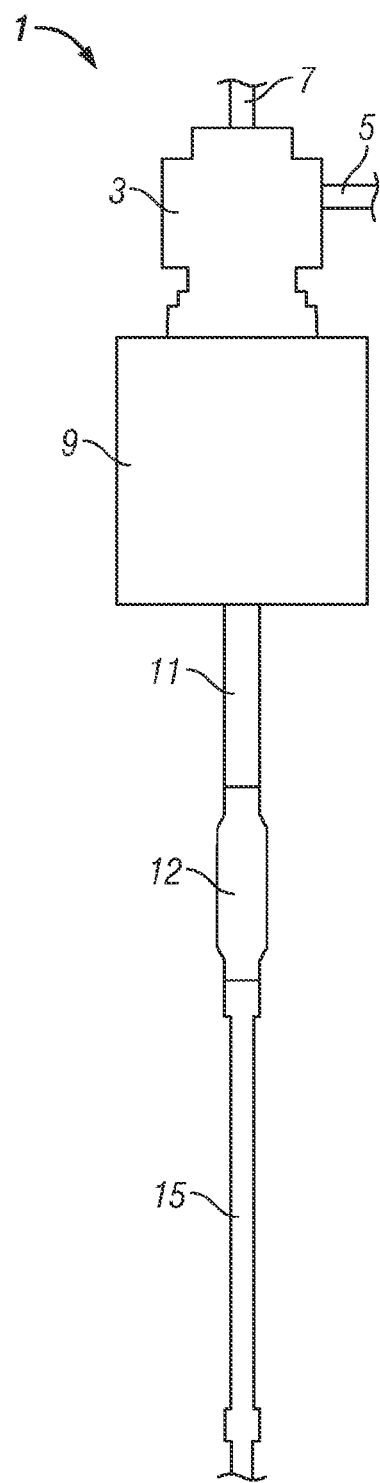
FIG. 1 is a schematic drawing of a portion of a drilling fluid circulation system.

The following description is directed to embodiments of a dual-flow valve and swivel. The embodiments disclosed are merely exemplary, and are not be interpreted, or otherwise used, as limiting the scope of the disclosure, including the claims. One of ordinary skill in the art will understand that the following description has broad application, and that the discussion is meant only to be exemplary of the described embodiments, and not intended to suggest that the scope of the disclosure, including the claims, is limited only to those embodiments.

Certain terms are used throughout the following description and the claims to refer to particular features or components. As one of ordinary skill in the art will appreciate, different persons may refer to the same feature or component by different names. This document does not intend to distinguish between components or features that differ in name but not function. Moreover, the drawing figures are not necessarily to scale. Certain features and components described herein may be shown exaggerated in scale or in somewhat schematic form, and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component couples to a second component, the connection may be through a direct engagement of the two components, or through an indirect connection, via other intermediate components, devices and/or connections.

FIG. 1 shows a drilling fluid circulation system 1, in part. The drilling fluid circulation system 1 includes a dual-flow swivel 3 having a first port that is connected to a fluid supply line 5 and a second port that is connected to a fluid return line 7. The fluid supply line 5 may receive fluid from a mud pump (not shown), while the fluid return line 7 may direct fluid toward a mud treatment system (not shown). The dual-flow swivel 3 is coupled to the top of a top drive 9. In the embodiment shown, dual-flow pipe sub 11 is attached to the bottom of the top drive 9. A dual-flow valve 12 has one end attached to the dual-flow pipe sub 11 and another end attached to a dual-flow drill pipe 15. Alternatively, the dual-flow valve 12 may be attached directly to the top drive, i.e., without the dual-flow pipe sub 11 being disposed between top drive 9 and dual-flow valve 12. In the arrangement shown in FIG. 1, two separate, independent flow paths are defined in the portion of the drilling fluid circulation system including the top drive 9. One flow path extends from the fluid supply line 5, through the dual-flow swivel 3, top drive 9, and dual-flow pipe sub 11, to the dual-flow valve 12. The other flow path extends from the dual-flow valve 12, through the dual-flow pipe sub 11, the top drive 9, and dual-flow swivel 3, to the fluid return line 7. The dual-flow drill pipe 15 also has two separate, independent flow paths. The dual-flow valve 12 can be selectively closed to block communication between the two independent flow paths in the top drive portion of the drilling fluid circulation system 1, and the two independent flow paths in the dual-flow drill pipe 15, as desired. Other parts of the drilling fluid circulation system 1, which are known in the art, are not shown in the interest of brevity.

Figure 2:
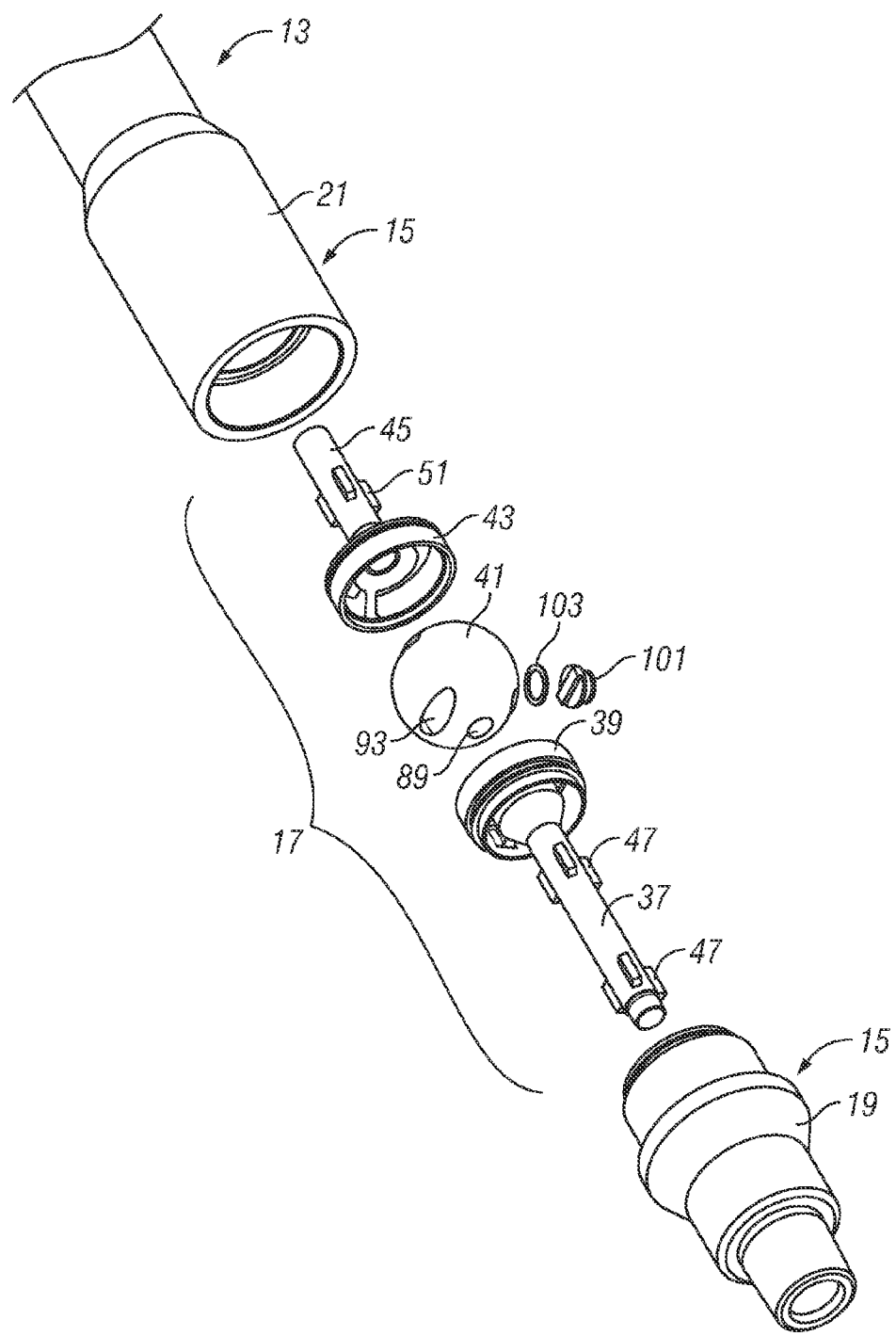
FIG. 2 is an exploded view of a ball-type dual-flow valve made in accordance with principles described herein.
Figure 3:
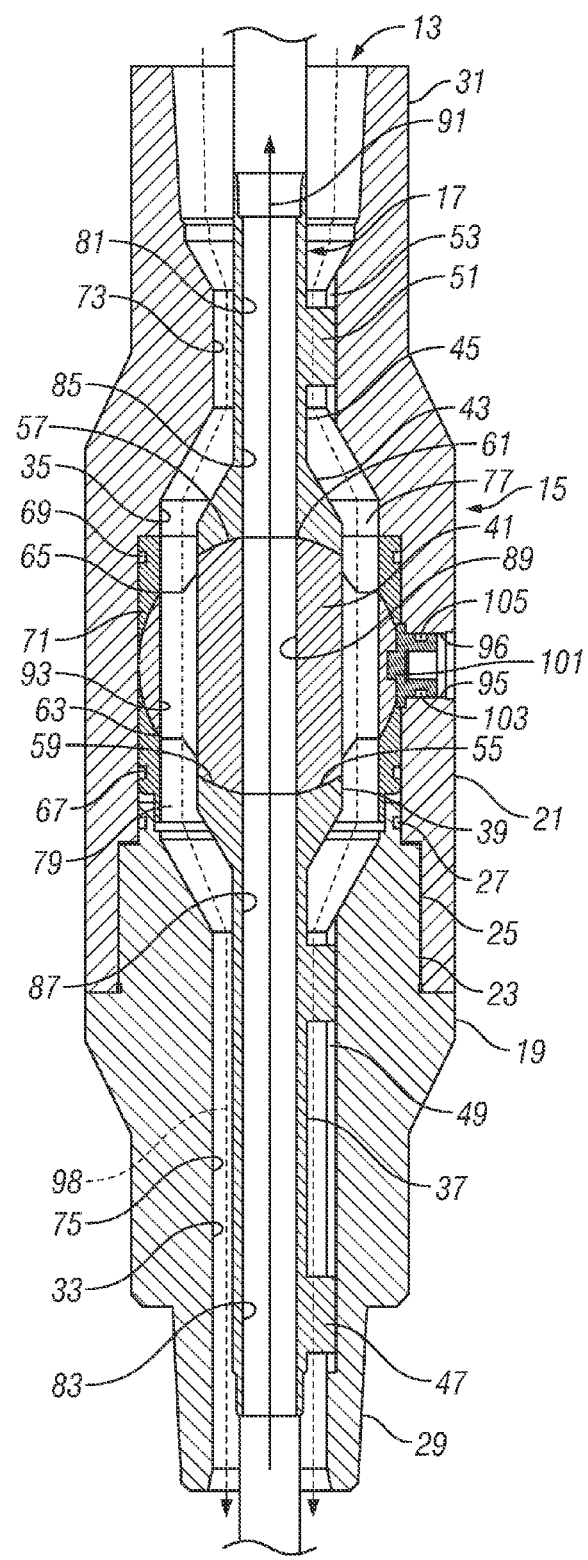
FIG. 3 is a vertical cross-section of the ball-type dual-flow valve shown in FIG. 2, with the valve in the open position.
Figure 4:
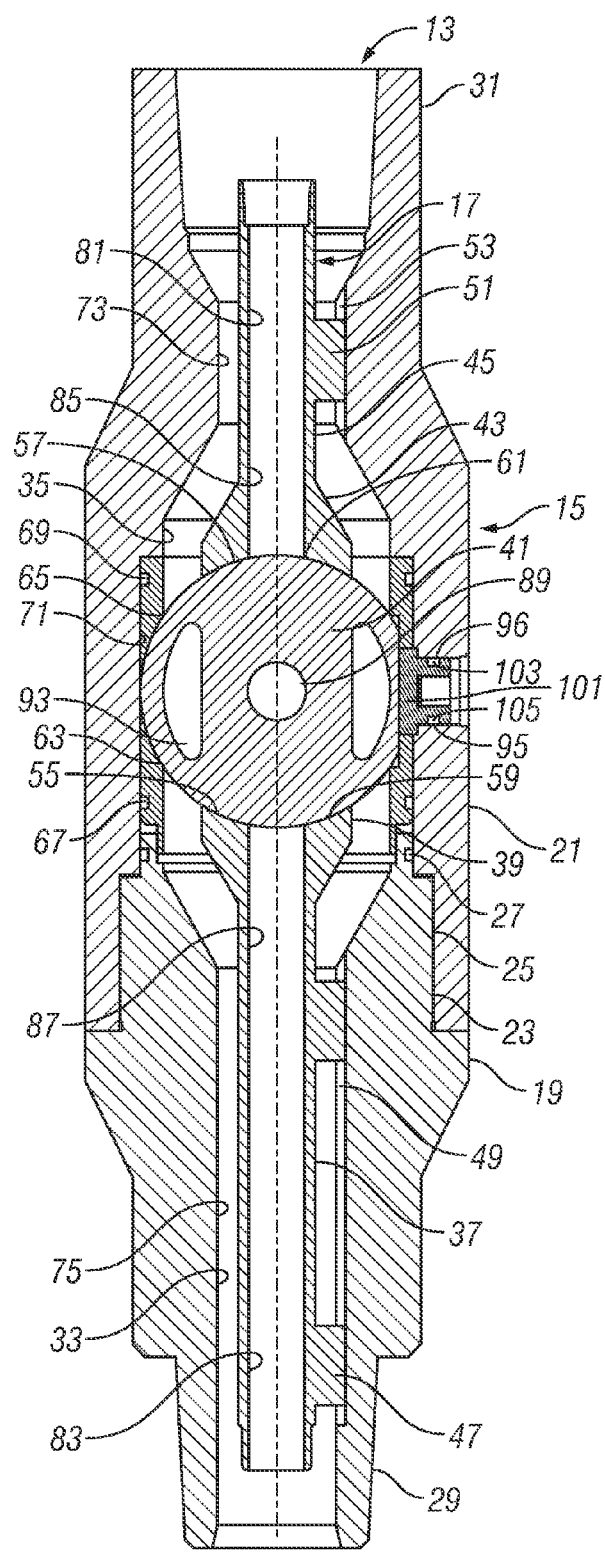
FIG. 4 is a vertical cross-section of the ball-type dual-flow valve of FIG. 2, with the valve in the closed position.

FIG. 2 shows an exploded view of one embodiment 13 of the dual-flow valve 12 of FIG. 1. FIG. 3 shows a cross-section of the dual-flow valve 13 in an open position. FIG. 4 shows a cross-section of the dual-flow valve 13 in a closed position. The dual-flow valve 13 shown in FIGS. 2-4 is of the ball-type. In FIG. 3, the dual-flow valve 13 is shown as having an outer valve portion (or outer valve body) 15 and an inner valve portion (or inner valve body) 17. The outer valve portion 15 includes an inner chamber 15a that envelopes the inner valve portion and includes a lower housing 19 and an upper housing 21, which are attached to each other via a suitable means. For example, the upper end of the lower housing 19 may include external threads 23 that can engage with internal threads 25 on the lower end of the upper housing 21. A seal 27 may be provided between the upper end of the lower housing 19 and the lower end of the upper housing 21. The outer valve portion 15 is constructed such that it can be arranged inline in a drilling apparatus, as shown in FIG. 1. For example, the upper end of the upper housing 21 may be in the form of a box having internal threads for engaging another drilling apparatus member, such as the dual-flow pipe sub 11 of FIG. 1, and the lower end of the lower housing may be in the form of a pin 29 having external threads for engaging another drilling apparatus member, such as the dual-flow drill pipe 15 of FIG. 1. The lower housing 19 and the upper housing 21 have bores or fluid passages 33, 35, respectively, which are in fluid communication and axially aligned when the lower housing 19 and the upper housing 21 are attached to each other as shown in FIGS. 3 and 4.

The inner valve portion 17 includes an inline arrangement of a lower pipe 37, a lower ball seat 39, a ball valve element 41, an upper ball seat 43, and an upper pipe 45. FIG. 3 shows that the inner valve portion 17 is disposed in the axially aligned bores 33, 35. The lower pipe 37 is supported in the bore 33 of the lower housing 19, and the upper pipe 45 is supported in the bore 35 of the upper housing 21. The lower pipe 37 includes spaced-apart tabs 47, which are received in spaced-apart slots 49 in the lower housing 19. The tabs 47 lock the lower pipe 37 in place in the bore 33 of the lower housing 19. The tabs 47 also help centralize the lower pipe 37 in the bore 33 of the lower housing 19. The upper pipe 45 also includes spaced-apart tabs 51, which are received in spaced-apart slots 53 in the upper housing 21. The tabs 51 function similarly to the tabs 47. The lower ball seat 39 is attached to the upper end of the lower pipe 37, and the upper ball seat 43 is attached to the lower end of the upper pipe 45. The ball seats 39, 43 have curved surfaces 55, 57, respectively, for engagement with curved portions of the ball valve element 41. Seals 59, 61 are provided on the curved surfaces 55, 57, respectively, to seal between the curved surfaces 55, 57 and the ball valve element 41. Seals 63, 65, are also provided on the curved surfaces 55, 57, respectively, to seal between the curved surfaces 55, 57 and the ball valve element 41. Seals 67, 69 are provided on the circumferences of the ball seats 39, 43, respectively. When the dual-flow valve 13 is assembled, the ball seats 39, 43 engage the inner wall 71 of the upper housing 21, with the circumferential seals 67, 69 sealing between the ball seats 39, 43 and the inner wall 71 of the upper housing 21.

Annular passages 73, 75 are defined between the upper pipe 45 and upper housing 21 and between the lower pipe 37 and lower housing 19, respectively. The ball seats 43, 39 have side openings 77, 79, respectively, that are aligned and in communication with the annular passages 73, 75. The upper pipe 45 and lower pipe 37 have central bores 81, 83. The ball seats 43, 39 have central openings 85, 87 that are aligned with and in communication with the bores 81, 83 of the upper pipe 45 and lower pipe 37, respectively. The ball valve element 41 is disposed between the ball seats 43, 39. The ball valve element 41 has a central bore 89 that can be selectively aligned with the central openings 85, 87 of the ball seats 43, 39 and central bores 81, 83 of the pipes 45, 37, thereby forming an inner flow path 91 through the inner valve portion 17. The ball valve element 41 also has side bores 93, 95 that are laterally offset from the central bore 89 and that can be selectively aligned with the annular passages 73, 75 (formed between the pipes 45, 37 and housings 21, 19) and the openings 77, 79 (formed in the ball seats 43, 39), thereby forming an outer flow path 98 between the inner valve portion 17 and the outer valve portion 15. As best shown in FIG. 4, in cross-section, side bores 93, 95 are laterally offset from central bore 89 and have curved outer surfaces and generally planar inner surfaces. Outer flow path 98 is an annular flow path at axial positions above and below valve element 41 with inner flow path 91 passing through the annulus of the annular segments of outer flow path 98. Further, outer flow path 98 diverges from a single passageway below valve element 41 to a multi-passage flow path within valve element 41 via side bores or passages 93, 95. Similarly side bores 93, 95 then converge again into a single passage segment flow path 91 above valve element 41.

An opening 96 is formed in the wall of the upper housing 21, adjacent to where the ball valve element 41 is arranged. A key 101 is fitted in the opening 96 and has a protrusion 102 (FIG. 2) that engages a hole in the ball valve element 41. The key 101 can be turned, for example, using a hex, to rotate the ball valve element 41 relative to the ball seats 43, 39. The key 101 is accessible for turning through the opening 96. A washer or friction ring 103 may be provided between the key 101 and the upper housing 21 at the opening 96. A seal 105 may also be provided to seal between the key 101 and the upper housing 21.

The ball valve element 41 can be rotated from an open position to a closed position or from a closed position to an open position. In the open position, as shown in FIG. 3, the central bore 89 of the ball valve element 41 is aligned with the central bores 81, 83 of the pipes 45, 37 and the central openings 85, 87 of the ball seats 43, 39. Also, the side bores 93, 95 of the ball valve element 41 are aligned with the annular passages 73, 75 (formed between the inner valve portion 17 and the outer valve portion 15) and the side openings 77, 79 (formed in the ball seats 43, 49). With the ball valve element 41 in the open position, the inner flow path 91 and the outer flow path 98 are open. In the closed position, the ball valve element 41 obstructs and prevents flow through the inner flow path 91 and the outer flow path 98. The closed position is shown in FIG. 4.

Referring to FIG. 4, in the closed position, the central bore 89 of the ball valve element 41 is not aligned (or in fluid communication) with the central bores 81, 83 of the pipes 45, 37 and the central openings 85, 87 of the ball seats 43, 39. Also, the side bores 93, 95 of the ball valve element 41 are not aligned with the annular passages 73, 75 (formed between the inner valve portion 17 and the outer valve portion 15) and the side openings 77, 79 (formed in the ball seats 43, 49). In the open position (shown in FIG. 3), the dual-flow valve 13 allows fluid exchange through both of the inner flow path 91 and the outer flow path 98. In the closed position (shown in FIG. 4), the dual-flow valve does not allow fluid exchange along either of the inner flow path and the outer flow path.

Figure 5:
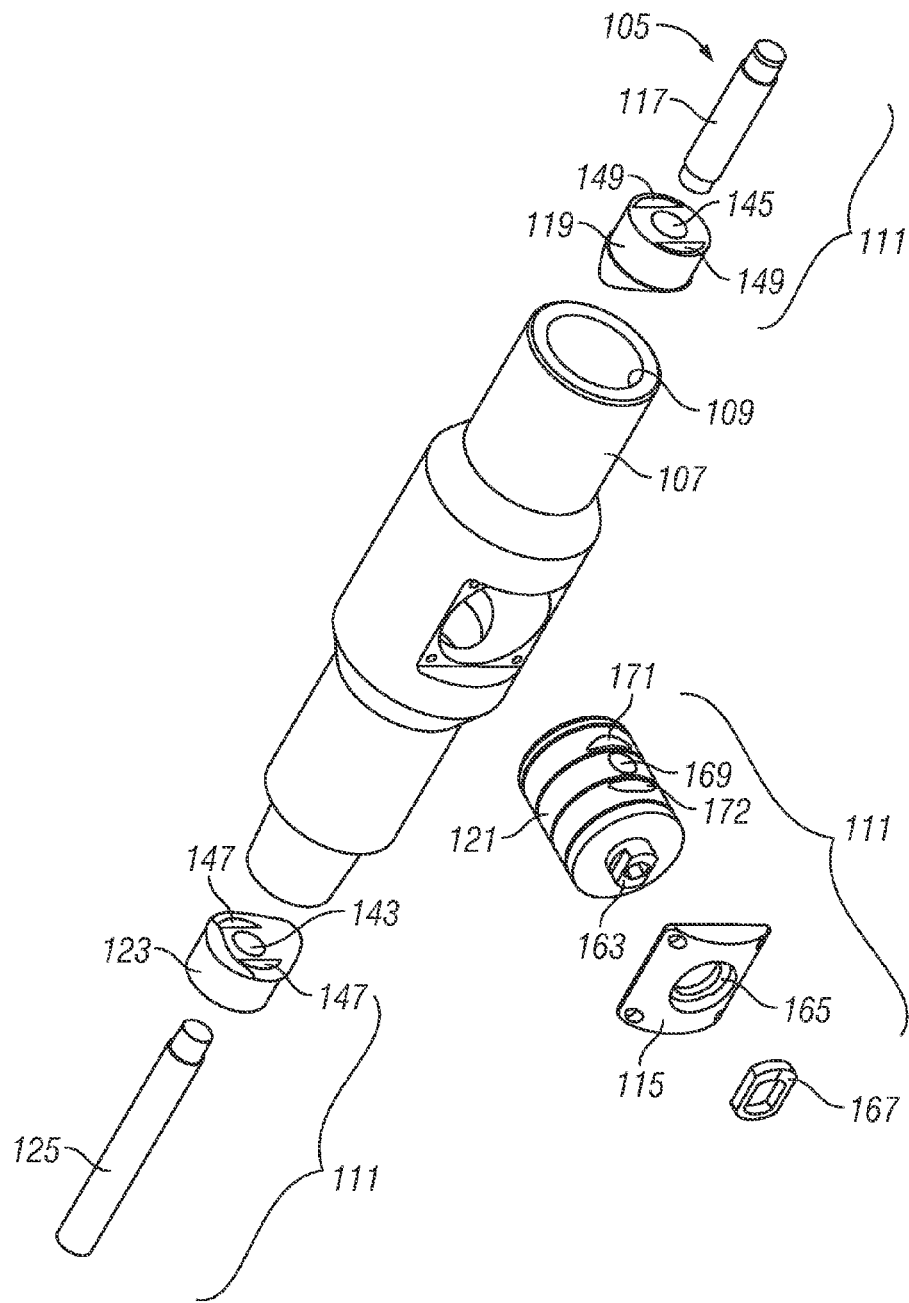
FIG. 5 is an exploded view of a drum-type dual-flow valve made in accordance with principles described herein.
Figure 6:
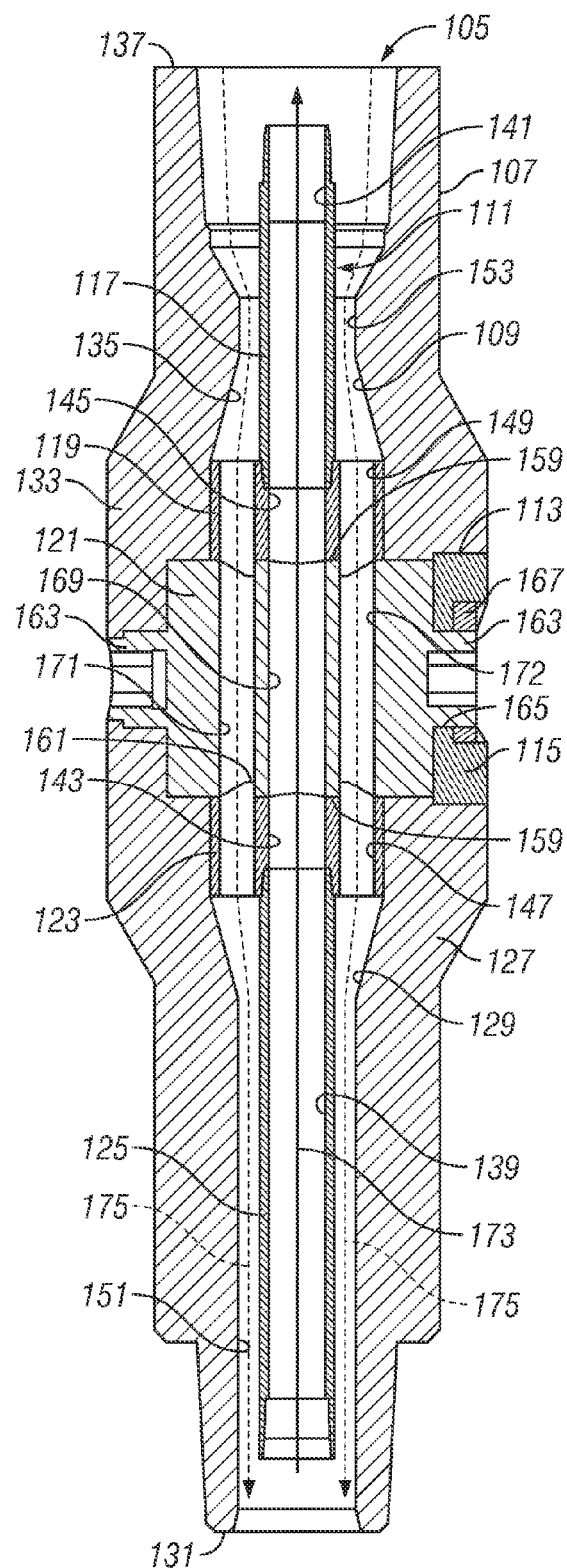
FIG. 6 is a vertical cross-section of the drum-type dual-flow valve of FIG. 5, with the valve in the open position.
Figure 7:
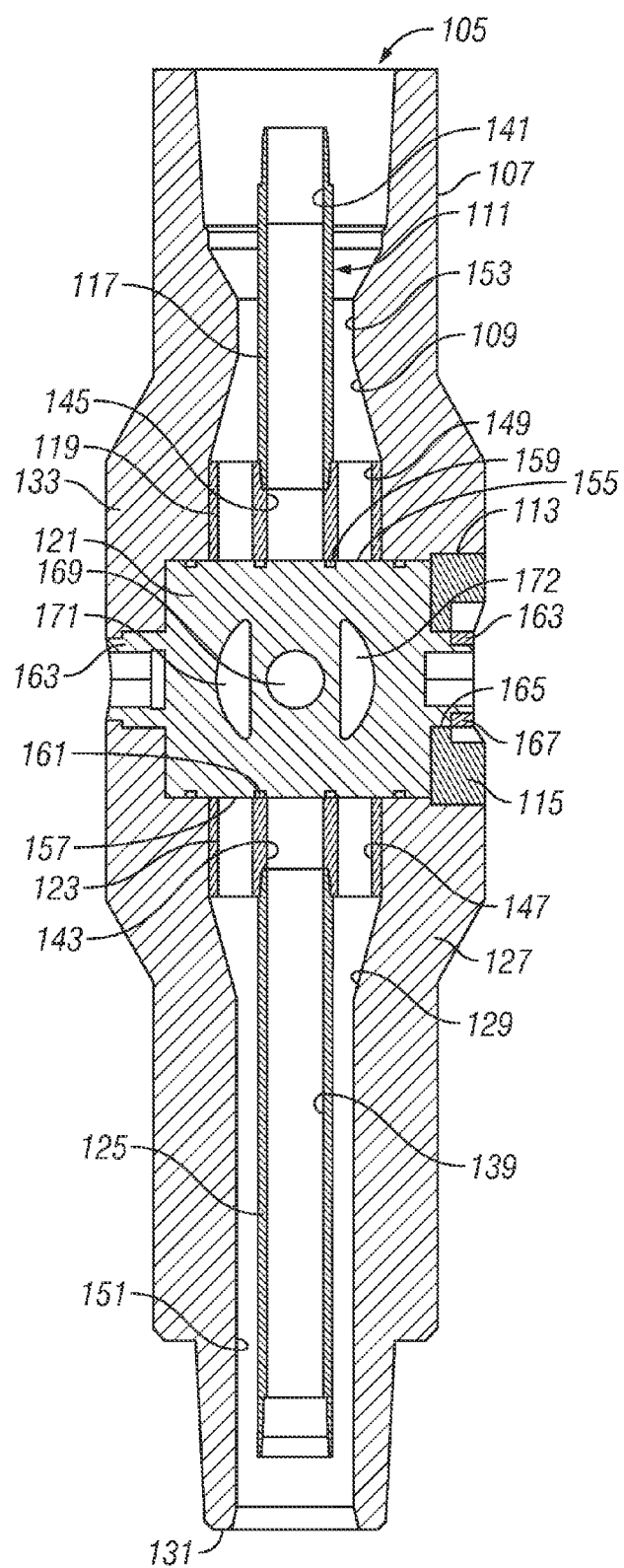
FIG. 7 is a vertical cross-section of the drum-type dual-flow valve of FIG. 5, with the valve in the closed position.

FIG. 5 shows an exploded view of another embodiment 105 of the dual-flow valve 12 of FIG. 1. FIG. 6 shows a cross-section of the dual-flow valve 105 in the open position. FIG. 7 shows a cross-section of the dual-flow valve 105 in a closed position. The dual-flow valve 105 shown in FIGS. 5-7 is of the drum-type and works similarly to the dual-flow valve 13 of FIGS. 2-4. Referring to FIG. 6, the dual-flow valve 105 is shown to include a valve housing (or outer valve body) 107 having a central bore 109 and an inner valve portion (or inner valve body) 111 disposed within the central bore 109. An opening 113 is formed in the wall of the valve housing 107. The wall opening 113 interconnects with the central bore 109. A retainer plate 115 can be mounted in the wall opening 113 in a manner so as to partially cover the wall opening 113. The inner valve portion 111 includes an inline arrangement of an upper pipe 117, an upper drum seat 119, a drum valve element 121, a lower drum seat 123, and a lower pipe 125.

The lower drum seat 123 is inserted into the central bore 109 of the valve housing 107 through the wall opening 113 and arranged in a lower portion 127 of the valve housing 107. A lower tapered section 129 of the central bore 109 prevents the lower drum seat 123 from falling out of the central bore 109 through the lower end 131 of the valve housing 107. The upper drum seat 119 is inserted into the central bore 109 of the valve housing 107 through the wall opening 113 and arranged in an upper portion 133 of the valve housing 107. An upper tapered section 135 of the central bore 109 prevents the upper drum seat 119 from falling out of the central bore 109 through the upper end 137 of the valve housing 107. The lower pipe 125 is attached to the lower end of the lower drum seat 123, e.g., by means of threads or other suitable attachment means. The upper pipe 117 is attached to the upper end of the upper drum seat 119, e.g., by means of threads or other suitable attachment means. The lower pipe 125 and the upper pipe 117 have axially-aligned central bores 139, 141, respectively. The lower drum seat 123 and upper drum seat 119 have central openings 143, 145, respectively, which are axially aligned with each other and with the central bores 139, 141 of the pipes 125, 117. The lower drum seat 123 and upper drum seat 119 have axial side openings 147, 149, respectively (best shown in FIG. 5), which are openings that are laterally offset from the central openings 143, 145. Annular passages 151, 153 are defined between the lower pipe 125 and valve housing 107 and between the upper pipe 117 and the valve housing 107, respectively. The annular passages 151, 153 are aligned with the axial side openings 147, 149 (FIG. 5) of the lower and upper drum seats 123, 119, respectively.

The drum valve element 121 is inserted into the central bore 109 of the valve housing 107 through the wall opening 113 such that the axial axis 122 of the drum valve element 121 is transverse to the axial axis of the central bore 109 of the valve housing 107. The drum valve element 121 is positioned between and rotatable relative to the upper drum seat 119 and the lower drum seat 123. The drum valve element 121 is retained between the upper drum seat 119 and the lower drum seat 123 by the retainer plate 115 that is mounted in the wall opening 113. The upper drum seat 119 and the lower drum seat 123 have surfaces 155, 157 (best shown in FIG. 7) for engaging the drum valve element 121. Seals 159, 161 are provided on the circumference of the drum valve element 121 to seal against these surfaces. The seals may be elastomeric seals, e.g., O-rings. Knobs or keys 163 are provided at the ends of the drum valve element 121. When the retainer plate 115 is mounted in the wall opening 113 of the valve housing 107, one of the knobs 163 protrudes into the wall opening 113 and into an opening 165 in the retainer plate 115. A key stop 167 can be inserted in between the knob or key 163 and the retainer plate 115 to prevent the drum valve element 121 from rotating. The key stop 167 can be removed, as needed, to allow the drum valve element 121 to be rotated.

The axial central openings 143, 145 and axial side openings 147, 149 in the drum seats 119, 123 are through-bores. Relative to drum axis 122, the drum valve element 121 has a transverse central bore 169 and two transverse side bores 171, 172. Side bores 171, 172 are laterally offset relative to central bore 169 and, in cross-section, have curved outer surfaces and generally planar inner surfaces. The drum valve element 121 can be rotated to an open position (shown in FIG. 5) in which the transverse central bore 169 aligns with the axial central openings 143, 145 of the drum seats 119, 123 and the transverse side bores 171, 172 align with the axial side openings 147, 149 of the drum seats 119, 123. The drum valve element 121 can also be rotated to a closed position (shown in FIG. 6) in which the transverse central bore 169 is not aligned with the axial central openings 143, 145 of the drum seats 119, 123 and the transverse side bores 171, 172 are not aligned with the axial side openings 147, 149 of the drum seats 119, 123. The dual-flow valve 105 has two separate and independent flow paths: (1) an inner path 173 along the axial central bores 139, 141 of the pipes, the axial central openings 143, 145 of the drum seats 119, 123, and the transverse central bore 169 of the drum valve element 121; and (2) an outer path 175 along the annular passages 151, 153 between the pipes 119, 123 and the valve housing 107, the axial side openings 147, 149 of the drum seats 119, 123, and the transverse side bores 171, 172 of the drum valve element 121. The separate flow paths 173, 175 can be opened or closed through appropriate rotation of the drum valve element 121 as explained above.

Figure 8:
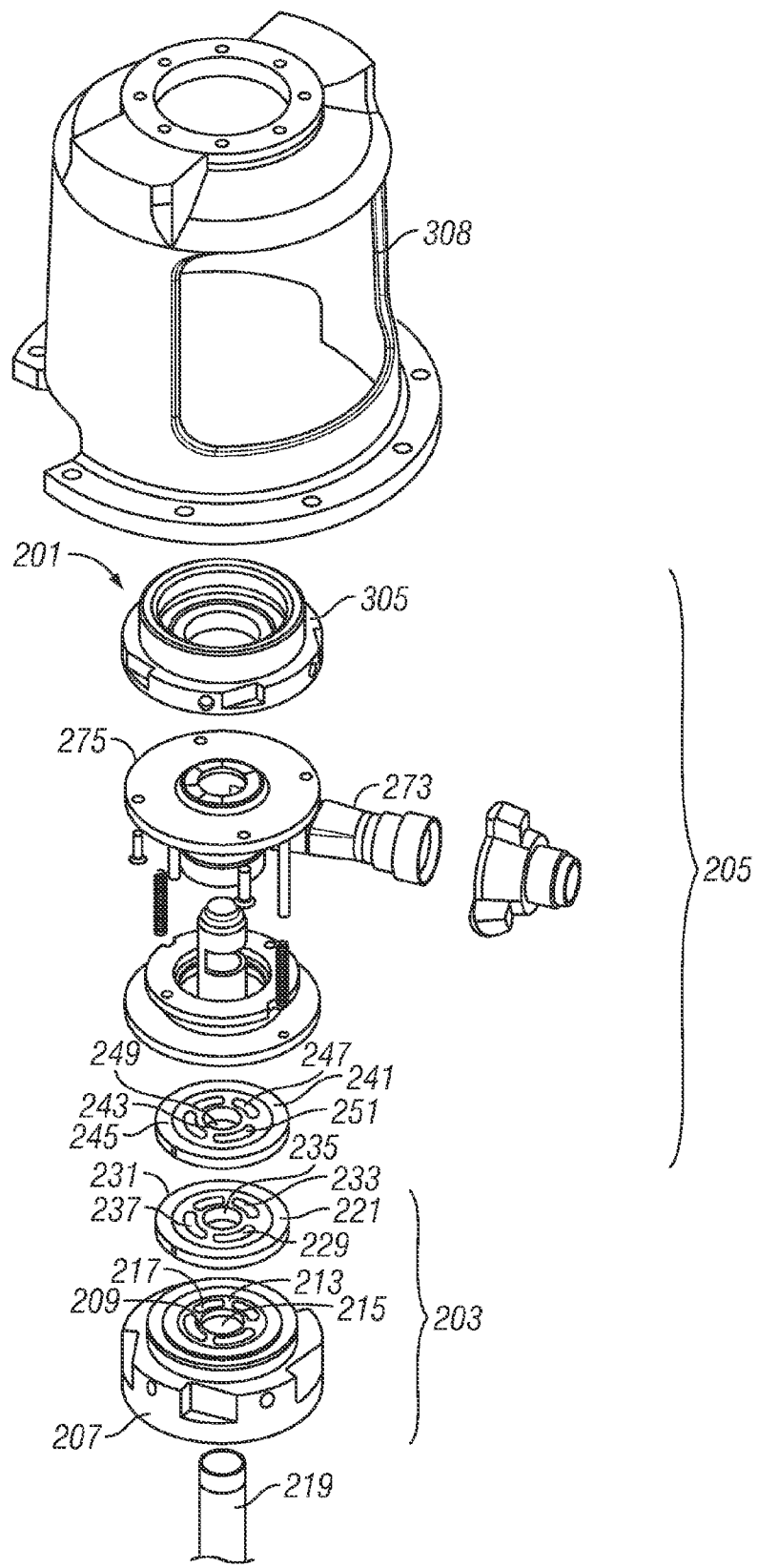
FIG. 8 is an exploded view of a dual-flow swivel made in accordance with principles described herein.
Figure 9:
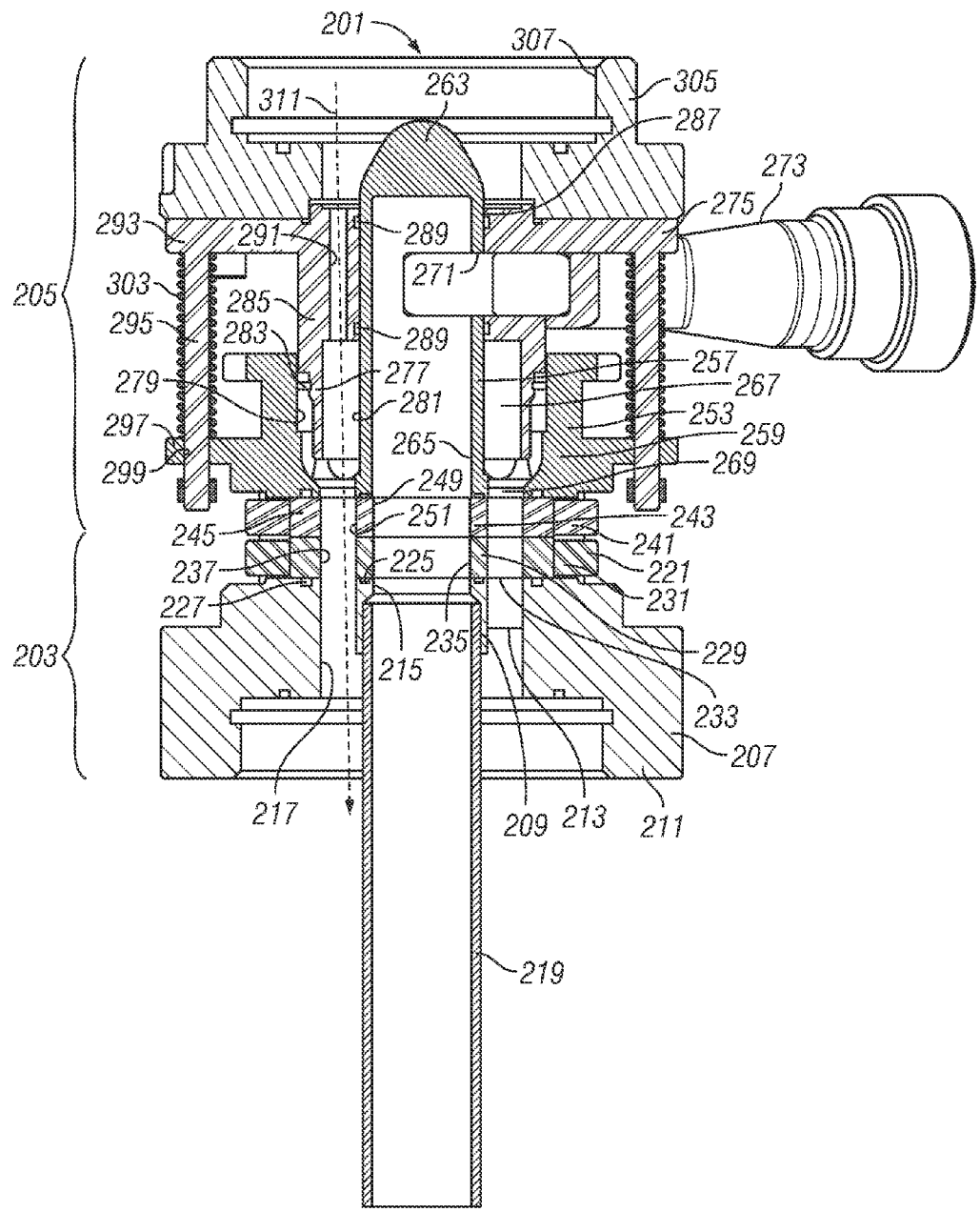
FIG. 9 is a vertical cross-section of a dual-flow swivel of FIG. 8.
Figure 10:
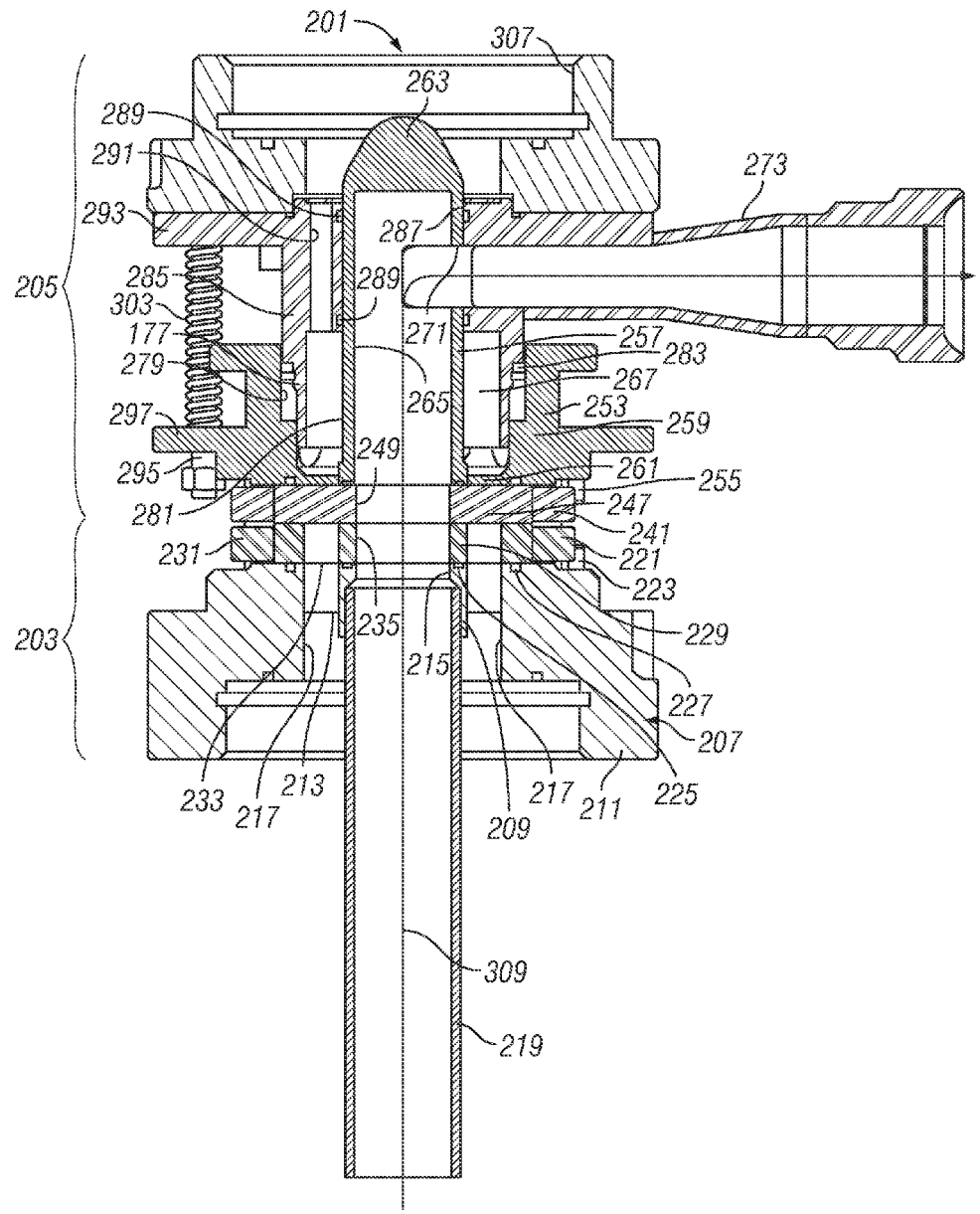
FIG. 10 is another vertical cross-section of the dual-flow swivel of FIG. 8.

FIG. 8 is an exploded view of one embodiment 201 of the dual-flow swivel 3 of FIG. 1. The dual-flow swivel 201 is for use as a sealing rotary joint between a rotating member (e.g., a top drive) and a non-rotating member (e.g., a mud hose) of a drilling apparatus. FIGS. 9 and 10 are vertical cross-sections of the assembled dual-flow swivel 201. In FIG. 9, the dual-flow swivel 201 includes a lower swivel assembly 203 and an upper swivel assembly 205. In use, the lower swivel assembly 203 would be coupled to the rotating member of the drilling apparatus, and the upper swivel assembly 205 would be coupled to the non-rotating member of the drilling apparatus.

The lower swivel assembly 203 includes a lower vessel (or nut) 207 having an inner wall 209 disposed within an outer body 211, the inner wall 209 being concentric with the outer body 211. The inner wall 209 is attached to the outer body 211 by radial webs 213. An inner passage 215 is defined within the inner wall 209, and outer passages 217 are defined by the inner wall 209, the outer body 211, and the radial webs 213. A pipe 219 is attached to the inner wall 209, by suitable means, e.g. threads. The pipe 219 may be used to couple the lower swivel assembly 203 to a rotating member or may be a component of a rotating member to which the lower swivel assembly 203 is coupled.

The lower swivel assembly 203 further includes a lower seal ring 221 mounted on the upper end of the lower vessel 207. The lower seal ring 221 is coupled to the lower vessel 207, by suitable means, e.g. a pin 223 (best shown in FIG. 10) on the lower vessel 207 that fits into a corresponding groove 223a (FIG. 8) formed in the outer cylindrical surface of the lower seal ring 221. The lower seal ring 221 has an inner conduit formed by inner wall 229, and an outer body 231, the inner wall 229 being concentric with the outer body 231. The inner wall 229 is attached to the outer body 231 by radial webs 233. An inner passage 235 is defined within the inner wall 229, and outer passages 237 are defined by the inner wall 229, the outer body 231, and the radial webs 233.

The inner passage 235 of the lower seal ring 221 is axially aligned and in fluid communication with the inner passage 215 of the lower vessel 207. The outer passages 237 of the lower seal ring 221 are aligned and in fluid communication with the outer passages 217 of the lower vessel 207. Annular seals 225, 227 (FIG. 9) are provided between the upper end of the lower vessel 207 and the lower end of the lower seal ring 221 to isolate the aligned inner passages 215, 235 from the aligned outer passages 217, 237.

The upper swivel assembly 205 includes an upper seal ring 241, which is placed in sealing engagement with the top of lower seal ring 221. In use, lower seal ring 221 rotates along with nut 207 in pipe 219 while upper seal ring 241 remains stationary. A dynamic seal is thus formed between the engaging and facing surfaces of seal rings 221, 241. The opposing faces of the upper seal ring 241 and lower seal ring 221 form a metal-to-metal seal when high pressure fluid is conducted through the swivel 201. The upper seal ring 241 has an inner conduit formed by inner wall 243, and an outer body 245, the inner wall 243 being concentric with the outer body 245. The inner wall 243 is attached to the outer body 145 by radial webs 247 (best shown in FIG. 10). An inner passage 249 is defined within the inner wall 243, and outer passages 251 are defined by the inner wall 243, the outer body 145, and the webs 247. The inner passage 249 of the upper seal ring 241 is aligned and in fluid communication with the inner passage 235 of the lower seal ring 221. The outer passages 251 of the upper seal ring 241 can be selectively aligned (and are in fluid communication) with the outer passages 237 of the lower seal ring 221.

The upper swivel assembly 205 further includes a lower seal carrier 253, which is placed in engagement with the top of the upper end of the upper seal ring 241. The upper seal ring 241 is coupled to the seal carrier 253 by suitable means, e.g. a pin 255 (best shown in FIG. 10) on the lower seal carrier 253 that fits into a corresponding groove 255a (FIG. 8) formed in the outer cylindrical surface of the upper seal ring 241. The lower seal carrier 253 has an inner pipe 257 and an outer body 259, the inner pipe 257 being concentric with the outer body 259. The lower end of the inner pipe 257 is connected to the outer body 259 by radial webs 261 (best shown in FIG. 10). The upper end 263 of the inner pipe 257 is closed off. An inner passage 265 is defined within the inner pipe 257. An annular chamber 267 is defined between the inner pipe 257 and the outer body 259. Outer passages 269 are defined by the inner pipe 257, the outer body 259, and the radial webs 261 (FIG. 10) at the lower end of the lower seal carrier 253. The annular chamber 267 is in fluid communication with the outer passages 251 of the upper seal ring 241 through the passages 269 in the lower end of the lower seal carrier 253. The inner passage 265 of the lower seal carrier 253 is aligned and in fluid communication with the inner passage 249 of the upper seal ring 241. The inner pipe 257 has a port 271 to which an outlet vessel 273 is connected.

The upper swivel assembly 205 includes an upper seal carrier 275 that is arranged concentrically with the lower seal carrier 253. The upper seal carrier 275 has a lower sleeve 277 that is disposed in the annular chamber 269 between the outer body 259 and the inner pipe 257 of the lower seal carrier 253. The lower sleeve 277 divides the annular chamber 269 into an annular chamber 279 (between the outer body 259 and the lower sleeve 277), and an annular chamber 281 (between the lower sleeve 277 and the inner pipe 257). A seal 283 is disposed in the annular chamber 279 to seal between the outer body 259 and the lower sleeve 277. The seal 283 is energized by differential pressure in the annular chamber 279. The upper seal carrier 275 includes an upper sleeve 285, which may be formed integrally with the lower sleeve 277. The upper sleeve 285 includes a central bore 287 in which a portion of the inner pipe 257 of the lower seal carrier 253 is received. Seals 289 are provided to seal between the upper sleeve 285 and the inner pipe 257. The upper sleeve 285 includes axial passages 291 that are laterally offset from the central bore 287. The passages 291 are in fluid communication with the annular chamber 281. The upper sleeve 285 has a flange 293 and posts 295 depending from the flange 293. The outer body 259 of the lower seal carrier 253 also has a flange 297 that is in opposing relation to the flange 293 of the upper seal carrier 275. The posts 295 extend through holes 299 in the flange 197. Nuts 302 are threaded to the ends of the posts 295. Springs 303 are arranged on the posts 295 to maintain a desired spacing between the opposing flanges 293, 297 and to support the upper seal carrier 275.

The upper swivel assembly 205 further includes an upper vessel 305 that is mounted on the upper end of the upper seal carrier 275. The upper vessel 305 has a central bore 307 that is in fluid communication with the passages 291 in the upper sleeve 285 of the upper seal carrier 275. The central bore 307 of the upper vessel 305 is connected to the fluid supply line 5 of FIG. 1.

Referring again to FIG. 8, the components of lower and upper swivel assemblies 203, 205 are assembled together as shown in FIG. 8 and as described above, with the facing surfaces of seal rings 221, 241 (FIG. 9) engaging one another. Protective cover 308 retains swivel assemblies 203, 205 in position and with seal rings 221, 241 engaging one another by being secured to the top of the top drive 9 (FIG. 1) by threaded fasteners (not shown) that are disposed in holes 308a formed in the flange 308b (FIG. 9).

The swivel 201 has two separate and independent flow paths (309 in FIG. 10) and (311 in FIG. 9) when assembled. Flow path 309 includes an axially-directed segment 309a and a radially-directed segment 309b. Flow path 311 is axially-directed and, in the embodiment shown, is laterally offset from flow path segment 309b. In one use of the swivel 201, flow path 309 (via segments 309a and 309b) allows communication between a fluid return line and an inner conduit of a dual-flow drill pipe, and flow path 311 allows communication between a fluid supply line and an outer conduit of a dual-flow drill pipe.

Figure 11:
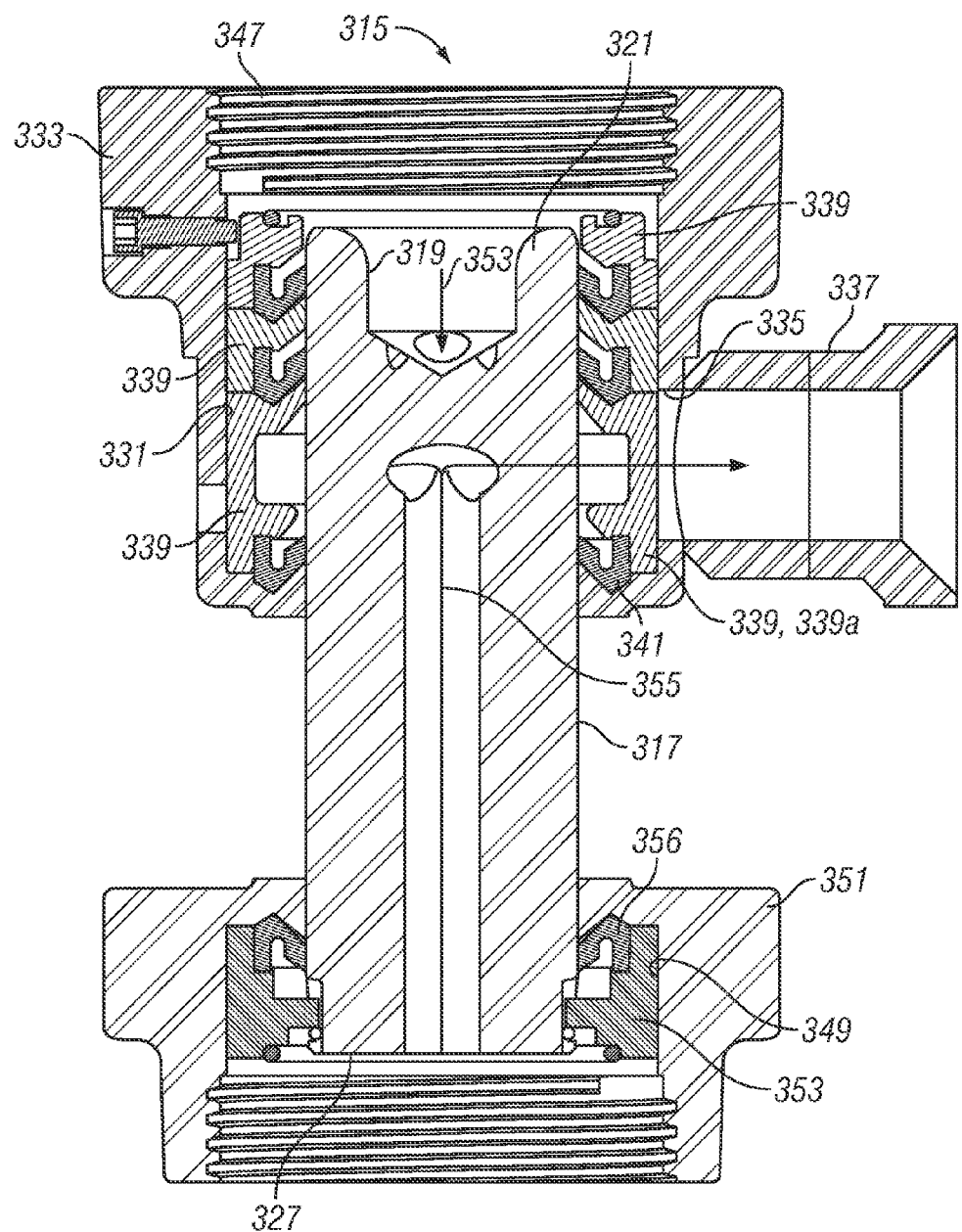
FIG. 11 is a vertical cross-section of another dual-flow swivel made in accordance with principles described herein.
Figure 12:
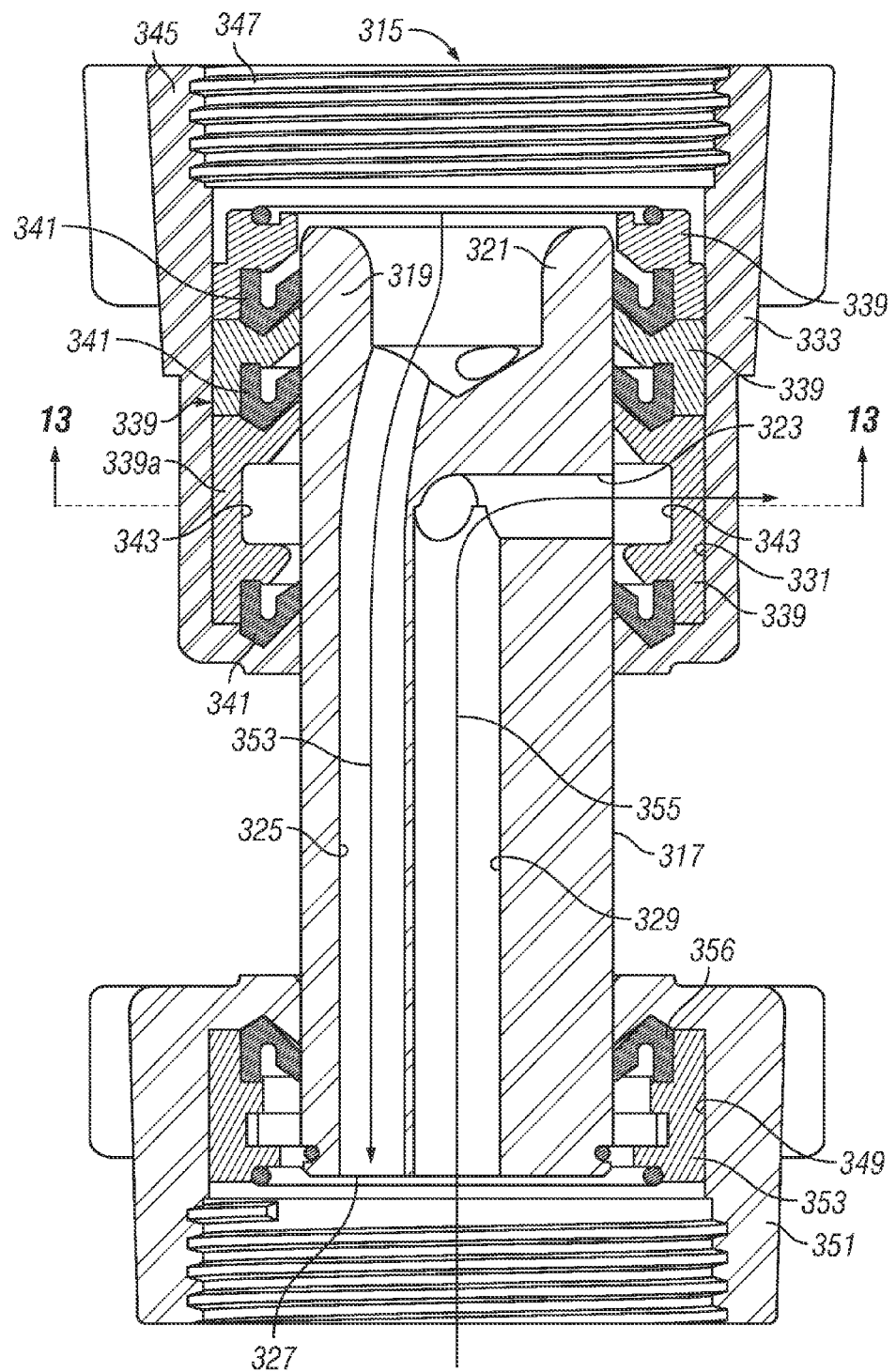
FIG. 12 is a vertical cross-section of the dual-flow swivel of FIG. 11.
Figure 13:
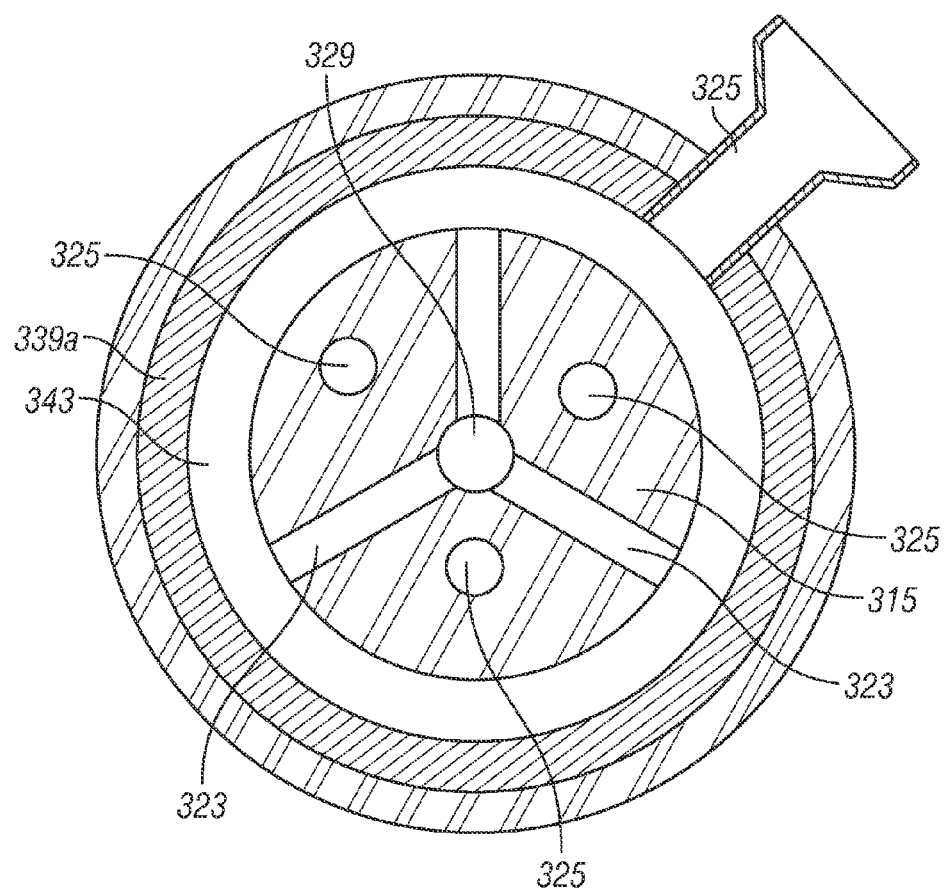
FIG. 13 is horizontal cross-section of the dual flow swivel of FIG. 11.

FIGS. 11-13 show cross-sections of another embodiment 315 of the dual-flow swivel 3. The dual-flow swivel 3 includes a tubular body 317. The tubular body 317 includes an inner chamber 319, which opens to an upper end 321 of the tubular body 317. The tubular body 317 includes a plurality of side ports 323, which are located between the upper end 321 of the tubular body 317 and a lower end of the tubular body 317. The side ports 323 are on the outer surface of the tubular body 317. A first set of internal passages 325 run from the lower end 327 of the tubular body 317 to the inner chamber 219. A second set of internal passages 329 run from the lower end 327 of the tubular body 317 to the side ports 323.

In this exemplary embodiment, the second set of internal passages 329 has one passage 329; however, in other embodiments, the second set may comprise two or more passages 329 extending from lower end 327 to side ports 323. The upper end 321 of the tubular body 317 is received within a central bore 331 of an upper vessel 333. The upper vessel 333 includes a side port 335 that is in communication with the side ports 323 in the tubular body 317. An outlet vessel 337 is connected to the side port 335 in the upper vessel 333. A stack of annular seal carriers 339, each of which carries an annular seal 341, is mounted between the upper vessel 333 and the tubular body 307. Seal carrier 339a includes an opening 343 through which the side ports 323 in the tubular body 317 can communicate with the side port 335 in the upper vessel 333 and then the outlet vessel 337. The upper end 345 of the upper vessel 333 includes threads 347 for connection to a member of a drilling apparatus. The lower end of the tubular body 317 is inserted into a central bore 349 of a lower vessel 351. A seal carrier 353 carrying a seal 356 is provided between the tubular body 317 and the lower vessel 351. Collectively, annular seal carriers 339 and seals 341 provide a dynamic seal between tubular body 317 and upper vessel 333. In this embodiment, swivel 315 may be described as having an upper swivel portion comprising upper vessel 333, seal carriers 339, seals 341, outlet vessel 337 (and other inter-engaging components that remain stationary relative to tubular body 317) and a lower swivel portion comprising tubular body 317, lower vessel 351, seal carrier 353, and seal 356 which are adapted to rotate relative to the upper swivel portion along with tubular body 317.

The swivel 315 provides two independent flow paths. A first flow path 355 runs from the lower end of the tubular body 317, through the second set of passages 329, through the side ports 323, through the opening 343 in the seal carrier 339a to the outlet vessel 337. A second flow path 353 runs from the lower end of tubular body 317 in an array of separate, internal passages 325 disposed circumferentially about flow path 355. The separate passages converge into a single passage at an axial location above side port 323 in tubular body 317, the single passage then continuing to upper chamber 319.

The dual-flow valves and swivels described above can be coupled to a top drive in order to enable dual flow through the top drive when the top drive is used with the new drilling method involving use of a dual-flow drill pipe.

While specific embodiments have been shown and described, modifications thereof can be made by one skilled in the art without departing from the scope or teachings herein. The embodiments described herein are exemplary only, and are not limiting. Many variations and modifications of the disclosed apparatus are possible and are within the scope of the invention. Accordingly, the scope of protection is not limited to the embodiments described herein, but is only limited by the claims that follow, the scope of which shall include all equivalents of the subject matter of the claims.

What is claimed is:
1. A dual flow valve comprising:
an outer valve body including an internal chamber;
a valve element rotatably disposed within the internal chamber and including a first passage and a plurality of second passages, wherein each of the second passages is isolated from the first passage;

a first valve seat disposed within the internal chamber and slidingly engaging the valve element, wherein the first valve seat includes a first fluid conduit extending therethrough and a plurality of second fluid conduits extending therethrough; and a second valve seat disposed within the internal chamber and slidingly engaging the valve element, wherein the second valve seat includes a first fluid conduit extending therethrough and a plurality of second fluid conduits extending therethrough;

wherein the valve element is configured to rotate between an open position and a closed position; and wherein, when the valve element is in the open position:

the first passage, the first fluid conduit of the first valve seat, and the first fluid conduit of the second valve seat are in fluid communication and define a first flow path through the valve element and the first and second valve seats; and the second passages, the second fluid conduits of the first valve seat, and the second fluid conduits of the second valve seat are in fluid communication and define a second flow path through the valve element and the first and second valve seats, wherein the second flow path is isolated from the first flow path; wherein the outer valve body includes a first end configured to couple to a first member of a drilling apparatus, and a second end configured to couple to a second member of the drilling apparatus, and wherein the second flow path includes a first annular passage radially positioned between the outer valve body and a first pipe extending from the first valve seat and a second annular passage radially positioned between the outer valve body and a second pipe extending from the second valve seat.

2. The valve of claim 1 wherein said valve element has a generally spherical outer surface.

3. The valve of claim 1 wherein said valve element has a generally cylindrical outer surface.

4. The valve of claim 1 wherein said second passages, in cross-section, have a curved outer surface and a generally straight inner surface.

5. The valve of claim 1, wherein the plurality of second passages comprise two second passages that are in fluid communication with the first annular passage and the second annular passage of the second flow path when the valve element is in the open position.

6. The valve of claim 1, wherein, when the valve element is in the closed position, the valve element;

inhibits fluid communication between the first fluid conduit of the first valve seat and the first fluid conduit of the second valve seat; and inhibits fluid communication between the second fluid conduits of the first valve seat and the second fluid conduits of the second valve seat.

7. The flow valve of claim 1 wherein said first passage extends along a first axis passing through said valve element, and wherein each of said second passages is laterally offset from said first axis.

8. The flow valve of claim 1, wherein the first annular passage extends from the first end to the second fluid conduits of the first valve seat, wherein the second annular passage extends from the second end to the second fluid conduits of the second valve seat.

9. The flow valve of claim 1, wherein the second flow path diverges from a single first annular passage to the plurality of second passages of the valve element.

10. The flow valve of claim 9, wherein each of the second passages of the valve element have a curved radially outer side and a generally straight radially inner side.

11. The flow valve of claim 9, wherein the first flow path includes the first pipe extending from the first fluid conduit of the first valve seat and wherein the first annular passage circumscribes the first pipe.

12. The flow valve of claim 9, wherein the plurality of second passages converge to a single second annular passage, wherein the second annular passage is axially spaced from the first annular passage.

13. A dual-flow valve, comprising:

an outer valve body including an internal chamber; and an inner valve body movably disposed within the internal chamber and further including:

a valve element including a first passage and a second passage, wherein the first passage is isolated from the second passage;

a first valve seat slidingly engaging the valve element and including a first fluid conduit extending therethrough and a second fluid conduit extending therethrough; and a second valve seat slidingly engaging the valve element and including a first fluid conduit extending therethrough and a second fluid conduit extending therethrough;

wherein the valve element is movable to:

selectively align the first passage with the first fluid conduit of the first valve seat and the first fluid conduit of the second valve seat; and selectively align the second passage with the second fluid conduit of the first valve seat and the second fluid conduit of the second valve seat; a first pipe having a first bore aligned with the first fluid conduit of the first valve seat, the first pipe defining a first annular fluid passage extending radially between the first pipe and the internal chamber; a second pipe having a second bore aligned with the first fluid conduit of the second valve seat, the second pipe defining a second annular fluid passage extending radially between the second pipe and the internal chamber; wherein the valve element is rotatably supported within the internal chamber by the first valve seat and the second valve seat; wherein rotation of the valve element shifts the dual flow valve between: an open position where the first bore, the first fluid conduit of the first valve seat, the first passage, the first fluid conduit of the second valve seat, and the second bore are aligned to define a first flow path, and the first annular fluid passage, the second fluid conduit of the first valve seat, the second passage, the second fluid conduit of the second valve seat, and the second annular fluid passage are aligned to define a second flow path, and a closed position where the first passage is not aligned with the first fluid conduit of the first valve seat, the first bore, the first fluid conduit of the second valve seat, or the second bore and the second passage is not aligned with the second fluid conduit of the first valve seat, the first annular fluid passage, the second fluid conduit of the second valve seat, or the second annular fluid passage.

14. The dual-flow valve of claim 13, wherein the valve element is a ball including the first passage and the second passage extending therethrough.

15. The dual-flow valve of claim 13, wherein the valve element is a drum including the first passage and the second passage extending therethrough.

16. The dual-flow valve of claim 13, wherein the outer valve body includes a first end configured to couple to a first member of a drilling apparatus and a second end configured to couple to a second member of the drilling apparatus.

* * * * *